United States Patent [19]

Hanneman

[11] Patent Number: 5,266,366

[45] Date of Patent: Nov. 30, 1993

[54] FRAMES CONSTRUCTED OF POLYMERIC MARBLE

[76] Inventor: Richard D. Hanneman, 115 Eldorado, Florissant, Mo. 63031

[21] Appl. No.: 653,905

[22] Filed: Feb. 12, 1991

[51] Int. Cl.⁵ .............................................. B44F 9/04
[52] U.S. Cl. .................................. 428/14; 40/152; 264/73; 428/15; 428/45
[58] Field of Search .................. 428/14, 15, 2, 45; 264/73; 40/152

[56] References Cited

U.S. PATENT DOCUMENTS

| | | | |
|---|---|---|---|
| 3,208,876 | 9/1965 | Dodge | 428/14 X |
| 3,856,257 | 12/1974 | Wetstone | 40/152 X |
| 4,209,486 | 6/1980 | Ross | 428/15 X |
| 4,269,798 | 5/1981 | Ives | 264/73 |
| 4,473,673 | 9/1984 | Williams et al. | 428/15 X |
| 4,656,217 | 4/1987 | Sugiura et al. | 524/430 |
| 4,678,819 | 7/1987 | Sasaki et al. | 428/15 X |
| 4,680,155 | 7/1987 | Rochefort et al. | 264/73 |
| 4,734,302 | 3/1988 | Baskin | 428/15 |
| 4,916,172 | 4/1990 | Hayashi et al. | 523/171 |
| 4,979,323 | 12/1990 | Wenkman et al. | 40/152.1 |
| 5,063,093 | 11/1991 | Mentzer | 264/245 X |

Primary Examiner—Henry F. Epstein

[57] ABSTRACT

Frames for displaying articles are made of polymeric marble comprised of a matrix forming amount of a resin composition and a filler to provide a marbleized appearance.

15 Claims, 1 Drawing Sheet

FRAMES CONSTRUCTED OF POLYMERIC MARBLE

FIELD OF THE INVENTION

This invention relates to frames for displaying articles such as pictures, which frames are constructed from polymeric marble.

BACKGROUND OF THE INVENTION

Many types of articles are displayed in frames for hanging on a wall or for placing on a table or desk. The frames are typically made of metal or wood. Although the metals and wood can be in many different colors, thicknesses, styles and forms, other forms and styles are desired.

New types of frame materials are in demand. New materials can add versitility and flare to the articles displayed.

SUMMARY OF THE INVENTION

This invention is a frame for displaying articles, which frame has a marbleized appearance. The frame is comprised of a polymeric composition containing a matrix forming amount of a resin composition and a filler to provide a marbleized appearance.

In another aspect, this invention is a process for displaying articles comprising placing a precured polymeric composition containing a marbleizing filler and a cure initiator into a mold, curing the composition to form a polymeric composition having a marbleized appearance, removing the composition from the mold and constructing the polymeric composition into a shape to hold and display the article.

The frames of this invention are made from polymeric marble and can be used to display any type of article. Examples of articles that can be displayed include pictures, certificates, diplomas, art works, sculptures, fabric articles and the like.

DETAILED DESCRIPTION OF THE INVENTION

Figure 1:
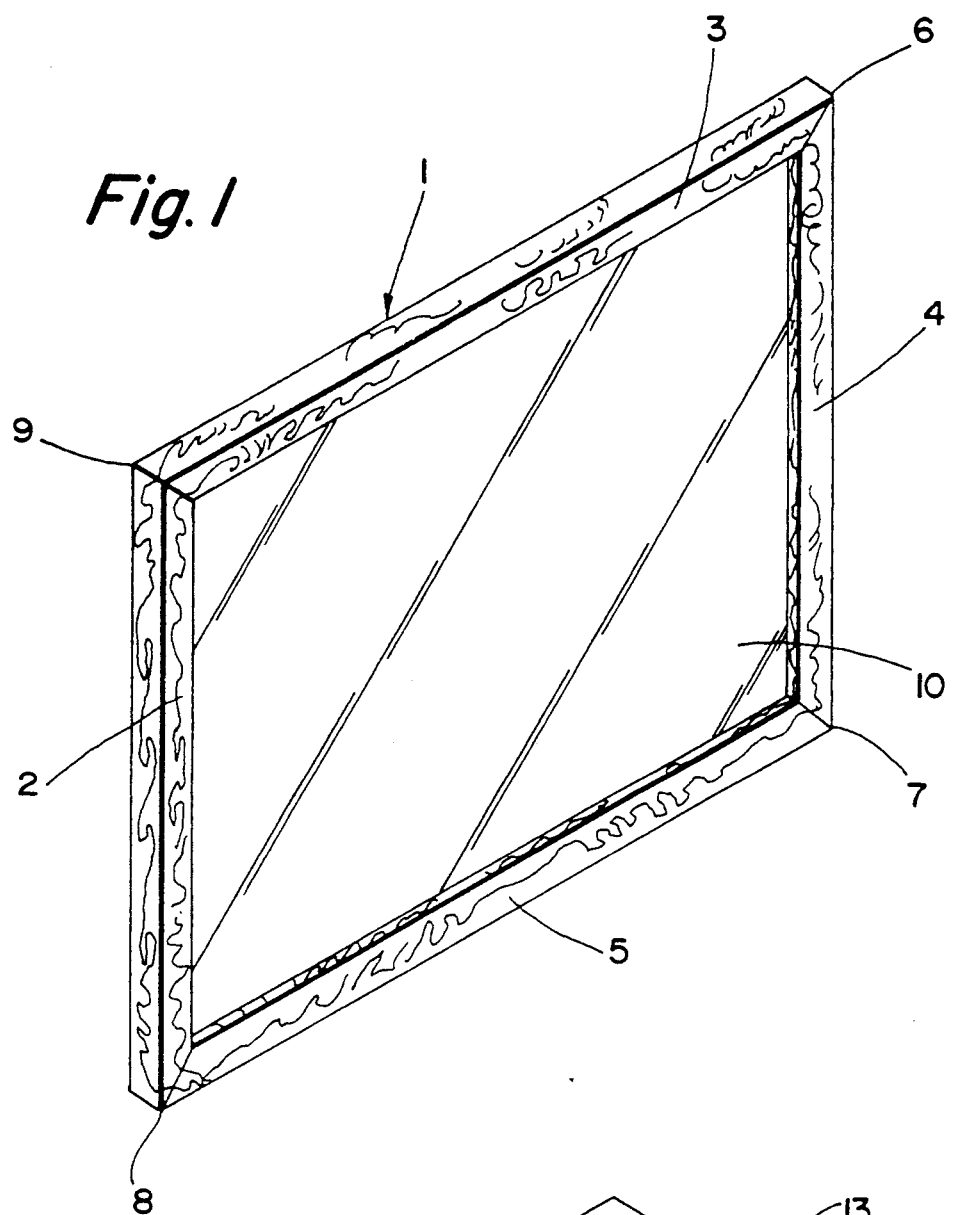
FIG. 1 depicts a picture frame having a marbleized appearance.

The compositions used to prepare the polymeric marble of this invention are typically comprised of a resin, a marbleizing filler and a cure initiator. The types of resin suitable for use in this invention are any of the resins used to provide solid structural parts. Examples include polyester resins. Preferred resins are the esters of carboxylic acids such as the acrylates, especially methyl methacrylate. Suitable resins are disclosed in U.S. Pat. Nos. 4,916,172; 4,678,819; 4,473,673; and 4,209,486, herein incorporated by reference. The resin is used in an amount to provide a matrix for the filler. Typically the amount can range, on a parts by weight of the composition basis, from about 10 parts to about 50 parts, and preferably from about 20 parts to about 30 parts. More than one type of resin can be used. The types of resins that are combined are limited by compatibility concerns. Monomers can also be used in combination with the resins. With polyesters, ethylenically unsaturated monomers such as vinyl chloride, ethylene and styrene are suitable. These monomers are employed to assist in the workability and cure of the precured composition. The resin or resin mixture will generally determine the clarity and color of the final polymeric marble. The polymeric marble can even have a relatively clear appearance.

The marbleizing filler is any material that when combined with a resin and cured will provide a marbleized appearance to the cured polymeric composition. Examples of suitable fillers include polyacrylic chips, calcium carbonate (such as the types available from the Georgia Marble Company), calcium silicate, glass frit, alumina trihydrate, aluminum hydroxide, magnesium hydroxide, silica, kaolin, clay, talc and the like. The amount of the filler will preferably make up the majority of the total weight of the polymeric marble. The amount will vary depending on the type of filler used and the type of resin used. Typically this amount will range, on a parts by weight of the composition basis, from about 50 to about 90 parts, and preferably from about 70 parts to about 80 parts. The filler particles will have a size so that the filler can be dispersed through the resin and so that the resin and filler mixture will have a viscosity suitable for introducing into the mold for the frame. The filler can optionally be treated with a coupling agent, such as a silane coupling agent, to aid in the adhesion of the resin with the filler.

A cure initiator is employed in the precured resin composition. The types of initiators used are those that are typically used for curing the types of resins. Examples include the free radical initiators such as the peroxides. Examples of suitable peroxides include benzoyl peroxide, cumene hydroperoxide, t-butyl hydroxide, di-t-butyl peroxide, diisopropylpeoxydicarbonate, di-n-propylperoxydicarbonate, di(2-ethylhexyl)peroxycarbonate, and methylethyl ketone peroxide (MEKP). These are used in a cure initiating amount.

The polymeric compositions can comprise other components as well. Examples of these optional components include dispersants to aid in the dispersing of the filler.

To prepare the frames of this invention the resin mixture is combined with the filler and the cure initiator and is introduced into the mold for the frame. These molds can be in a variety of sizes and shapes, and can be made of a variety of materials. Suitable materials include fiber reinforced plastics and stainless steel. Preferably, stainless steel is used. A preferred shape for the mold will provide a frame strip that is L-shaped. Preferably, the one leg of the L is between about 2 and about 6 inches in length, and the other leg of the L is between about 1 and 3 inches in length.

The molds are generally treated with a suitable mold release agent. The precured polymeric marble mixture is placed in the mold in a manner sufficient to form the mixture into the shape of the mold. Advantageously, the mixture is injected with pressure into the mold. For example, the mixture can be placed in a tube and then injected into the mold through the tube. Another advantageous method is to cast the mixture on the surface of the mold. A mold sufficient to provide L-shaped strips can have one part hinged to a second part. The first and second parts are L-shaped and when closed together they provide an L-shaped opening into which the polymeric mixture can be placed. In this mold, the mixture can be cast onto one of the parts when the mold is in the open position and then the mold is closed to cure the composition. Alternatively, the two parts can be closed and the mixture can be injected into the opening between the two parts. The polymeric marble composition is kept in the mold until it is fully cured. The cured polymeric marble composition is then removed from the mold. It can be in the form of a strip that can be cut into smaller strips and assembled to custom fit the article to be framed. Alternatively, the mold can be in the shape of a frame itself. Upon removing these preformed frames from the mold the frames are ready for use. The other components of the frames can include the types of components that are used with conventional frames, such as glass or clear plastic sheet, backing material and matting material.

The frames of this invention have separate sides of polymeric marble joined together to enclose an area for displaying an article. The sides of the frame when joined can form a variety of geometric shapes such as circles, rectangles, triangles, or other polygons. Rectangles are preferred. When assembling the frames, the strips are constructed to form the desired geometric shape with an opening to display the article. The ends of the strips can be secured to each other by a suitable adhesive. A preferred adhesive is a mixture of the resin and the initiator used to prepare the frame. Other glues are also suitable.

Because the molds for the polymeric marble can be formed into such a variety of shapes, sizes, forms and patterns the polymeric marble frames of this invention have a versility and creativity that conventional metal and wood frames lack. For example, the molds for the polymeric marble can have a relief or pattern on it to provide a frame with the relief or pattern on its surface.

Referring to FIG. 1, frame 1 has parallel sides 3 and 5 joined to each other by parallel sides 2 and 4. Frame 1 has four ninety degree corners 6, 7, 8 and 9 formed by the four points at which sides 3 and 5 join sides 2 and 4. Sides 2, 3, 4 and 5 enclose area 10 for displaying an article.

Figure 2:
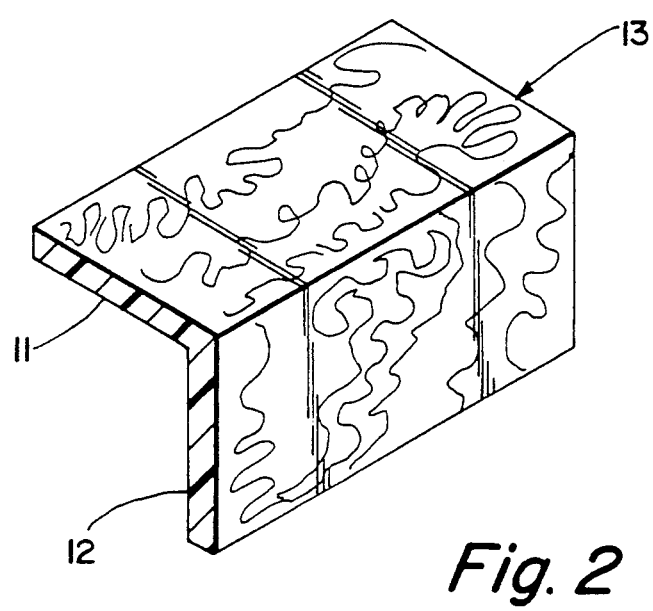
FIG. 2 depicts an end view of a frame strip.

Referring to FIG. 2, a strip 13 of the frame is L-shaped having legs 11 and 12.

The following examples illustrate but do not limit the scope of the invention.

EXAMPLES

Example 1

A precured polymeric marble composition is prepared from 24 weight parts of Stypol 40-5722 (a polyester resin and styrene mixture that is a clear light blue liquid and is available from Freeman Chemical Corporation), 76 parts by weight of calcium carbonate and 1.25 weight percent based on the weight of the resin of MEKP cure initiator. The composition is placed in a mold to provide an L-shaped strip that is eight feet long. The thicknesses of the legs of the L are about 0.25 inch and the width of the one leg is about 1.5 inches and the width of the other is about 1.0 inch. The compositon is mixed at between about 23 and about 26 degrees C, the gel time is about 25 minutes, the demold time is between about 1.5 and about 2 hours and the peak exotherm is between about 49 and 54 degrees C. The cured polymeric strip has a marbleized appearance.

The strip is cut into smaller pieces with the pieces having ends angled at 45 degrees. The ends are adhered to each other with a small amount of the resin and cure initiator mixture to provide a rectangle. A sheet of glass is cut to fit within the crook of the L and a picture is placed next to the glass. The glass and picture are secured to the frame to provide a picture framed in a polymeric marble frame.

Example 2

Another precured polymeric composition is prepared by mixing 29 weight parts of Stypol 40-4901 (a clear NPG/isophthalic gel resin available from the Freeman Chemical Corporation), about 70 weight parts of calcium carbonate filler, and about 2 weight percent based on the weight of the resin of MEKP cure initiator. The mixture is placed in a mold of the same dimensions and shape as the mold of Example 1. The cured part has a clear marbleized appearance. Strips of the polymeric marble are cut and assempled into a rectangular frame.

What is claimed is:

1. A frame for displaying articles, which frame has a marbleized appearance and which is comprised of a polymeric composition containing a matrix forming amount of a resin composition, which resin composition is comprised of a polyester resin and an ethylenically unsaturated monomer, and a filler to provide a marbleized appearance.

2. The frame of claim 1, wherein the ethylenically unsaturated monomer is styrene.

3. The frame of claim 2, wherein the filler is calcium carbonate or alumina trihydrate.

4. The frame of claim 3, wherein the frame has strips of a marbelized appearance that are L-shaped and the frame is a rectangle.

5. The frame of claim 1, wherein the filler is calcium carbonate or alumina trihydrate.

6. The frame of claim 1, wherein the frame is colored.

7. The frame of claim 1, wherein the frame is clear.

8. A process for making a frame for displaying articles, the process comprising placing a polymeric composition containing a matrix forming amount of a resin composition, which resin composition is comprised of a polyester resin and an ethylenically unsaturated monomer, a marbleizing filler and a cure initiator into a mold, curing the composition to form a polymeric composition having a marbleized appearance, removing the cured composition from the mold and constructing the cured composition into a frame to hold and display the articles.

9. The process of claim 8, wherein the polymeric composition is placed into the mold by injecting the composition into the mold.

10. The process of claim 9, wherein the ethylenically unsaturated monomer is styrene.

11. The process of claim 10, wherein the cure initiator is a free radical initiator.

12. The process of claim 11, wherein the initiator is methylethyl ketone peroxide.

13. The process of claim 12, wherein the filler is calcium carbonate or alumina trihydrate.

14. The process of claim 8, wherein the filler is calcium carbonate or alumina trihydrate.

15. The process of claim 8, wherein the mold has a shape to provide strips that are L-shaped.

* * * * *